March 17, 1942.　　F. KOPPELMANN　　2,276,784
CONVERTER AND RECTIFIER
Filed Jan. 25, 1937　　4 Sheets-Sheet 1

Fig. 1

Inventor
Floris Koppelmann
by Knight Bros
Attorneys

March 17, 1942. F. KOPPELMANN 2,276,784
CONVERTER AND RECTIFIER
Filed Jan. 25, 1937 4 Sheets-Sheet 4

Inventor
Floris Koppelmann
by Knight Bros
Attorneys

Patented Mar. 17, 1942

2,276,784

UNITED STATES PATENT OFFICE 2,276,784

CONVERTER AND RECTIFIER

Floris Koppelmann, Berlin-Siemensstadt, Germany, assignor to Siemens-Schuckertwerke Aktiengesellschaft, Berlin-Siemensstadt, Germany, a corporation of Germany Application January 25, 1937, Serial No. 122,232
In Germany January 4, 1936

32 Claims. (Cl. 175—364)

My invention relates to converters in which a circuit breaker is connected in each phase of an alternating-current circuit, the circuit breakers being operated in synchronism with the current to be interrupted. More particularly, my invention relates to rectifiers or other converters in which means are provided in the alternating-current circuit which distort the current curve so as to reduce the current intensities in the neighborhood of the point at which the current passes the zero value, and in which each circuit breaker opens its contacts within the time interval during which the current intensities are thus reduced. Such rectifiers and other converters are described in my copending application Serial No. 114,965 filed December 9, 1936.

An object of my invention consists in designing rectifiers and other converters of the above-indicated character in such a manner that the output energy, for instance the voltage and current intensity of the direct current produced by rectification, may be regulated.

Another object of my invention is to provide simple and reliable mechanical and electrical means in order to effect such a regulation.

With the above and other objects in view, which will appear as the description proceeds, the invention resides in the combination and arrangement of parts and in the details of construction hereinafter described and claimed, it being understood that changes in the embodiments of the invention herein disclosed can be made within the scope of what is claimed without departing from the spirit of the invention.

According to my invention, a converter having a contact breaker arranged in each phase to be interrupted, is provided with a variable impedance which is series connected with each circuit breaker and designed to periodically flatten the curve of the current to be interrupted in the neighborhood of its zero passage, in combination with regulatable means for varying the relation, for instance the phase position, of the flattened curve portions with respect to the voltage cycle or the operating cycle of the circuit breaker so as to thereby control the energy transferred through the breaker.

For a further understanding of the nature and object of the invention reference may be had to the following detailed description taken in conjunction with the accompanying drawings, in which like numerals are employed to designate like parts throughout the same, and in which.

Figure 1:
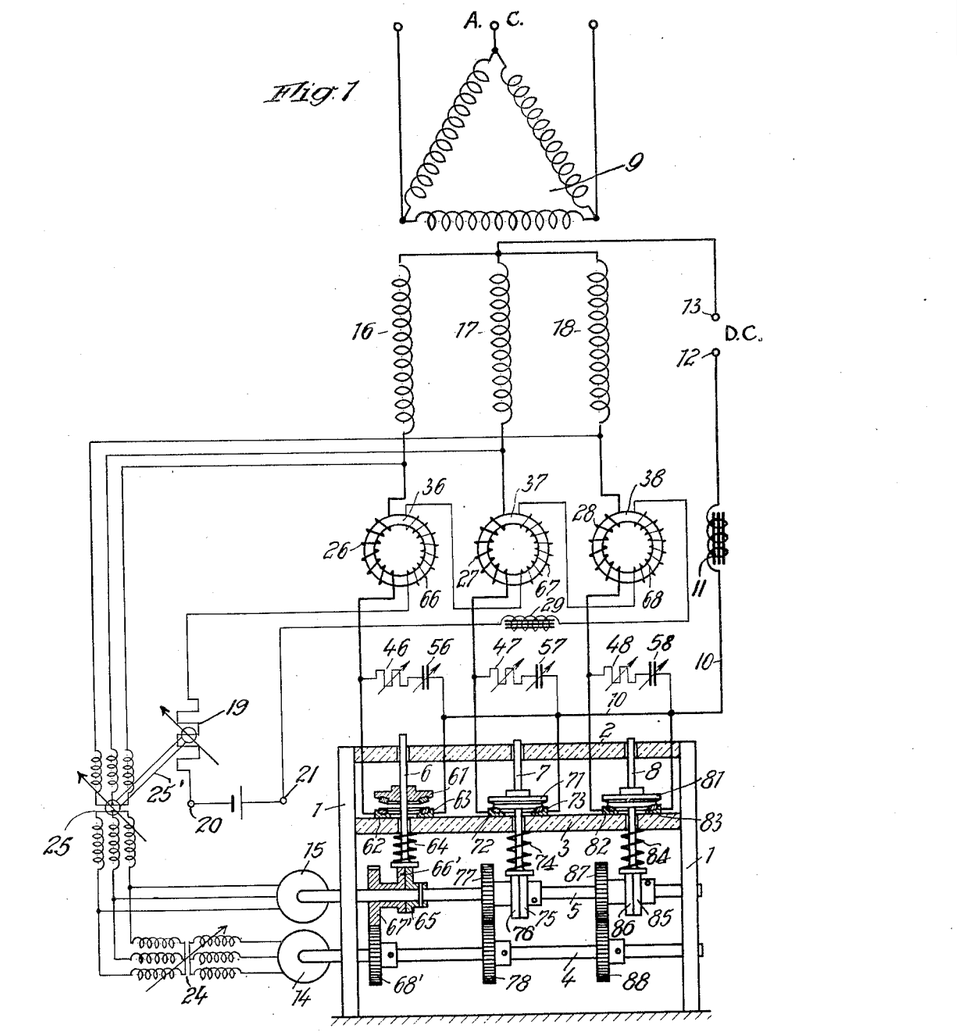
Fig. 1 shows a rectifier according to the invention in diagrammatic form and the wiring diagram therefor.

Referring to Fig. 1, 1 is the frame of the mechanical part of a rectifier according to the invention, 2 and 3 denoting two traverses thereof made of insulating material. Two shafts 4 and 5 are mounted in the frame 1. The shaft 4 is connected to a synchronous motor 14, and shaft 5 is connected to a second synchronous motor 15. On the traverses 2 and 3 are mounted three circuit breakers, each of which is provided with a tappet 6, 7 or 8 which is slidably arranged in both traverses 2 and 3. Secured to each tappet is a contact bridge 61, 71, 81 respectively, the traverse 3 being provided with two contacts 62 and 63, 72 and 73, 82 and 83 for each circuit breaker. Every pair of contacts, for instance 62 and 63, is electrically connected in the closed position by the respective contact bridge such as 61. Each tappet is provided with a spring 64, 74, 84 respectively which tends to close the contact. As will be apparent from Fig. 1 the circuit breakers have a design similar to the valve mechanism employed in internal combustion engines. The contacts 61, 62, 63, etc., may be provided with inserts of high grade material. Preferably inserts of a good conducting material are employed so that the loss of voltage at the point of contact is small. However, also contact pieces or contact inserts may be employed consisting of pressed material, for instance, of a mixture of metal and carbon. Furthermore, one of the contact pieces contacting with each other may be made of such a material and the other of metal.

On the shaft 5 are arranged pairs of cam discs 65, 66'; 75, 76; 85, 86 one pair for each circuit breaker. The cam discs 65, 75, 85 are firmly secured to the shaft 5 by a pin, whereas the cam discs 66', 76, 86 are loosely mounted thereon and form an integral part with the gears 67', 77, 87 respectively. The latter mesh respectively with gears 68', 78, 88 firmly secured to the shaft 4.

Figure 2:
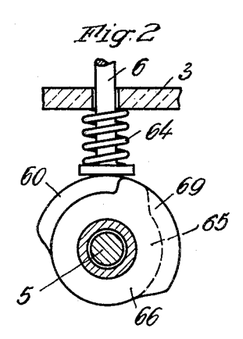
Fig. 2 shows a side elevational view of a detail of the mechanical part of the rectifier shown in Fig. 1.

The detailed construction of the cam discs is shown in Fig. 2 which is a side elevational view of the cam disc 66'. The cam disc has a radially projecting cam 69. The adjacent disc 65 has also a cam 60. Upon the rotation of both cam discs 65 and 66', the tappet 6 is moved in the upward direction against the action of the spring 64 and as soon as the cams have passed the tappet the latter moves again in the downward direction.

The device is, as hereinafter described, so designed that both discs 65 and 66' have the same speed of rotation and that the cams 60 and 69 may be adjusted with respect to each other. If the cams 60 and 69 are so adjusted that they coincide with each other, the time within which the tappet 6 is raised is shortest and the duration of the switching-in operation is greatest. If, however, the cams are so adjusted that one projects beyond the other in circumferential direction the tappet 6 is raised for a longer time and the contact is closed for a shorter time. If a smooth direct current is to be produced by the rectifier the cam discs are preferably so dimensioned and so adjusted that the shortest time interval of each switching-in operation amounts to one third of a cycle. This time interval may be increased by displacing the cams with respect to each other.

The rectifier comprises further the following electrical parts: As an alternating-current source, a transformer is employed whose primary winding is denoted by the numeral 9 and whose secondary windings are numbered 16, 17 and 18. The winding 16 is connected to contact 62 through the winding 26 of a reactor the magnet body of which is designated by the numeral 36. Corresponding reactors 27, 37 and 28, 38 are provided between the secondary windings 17, 18 of the transformer respectively and the corresponding contacts 72, 82 of the circuit breaker.

The contacts 63, 73 and 83 are connected to a common conductor 10 which is connected through a reactance coil 11 to an output terminal 12 which forms one of the supply terminals for the rectified current. The other output terminal 13 is connected to the neutral point of the secondary windings 16, 17, 18 of the main transformer.

The synchronous motors 14 and 15 are connected to the secondary windings 16, 17, 18 of the main transformer through transformers 24 and 25 respectively. Transformer 25 permits adjusting the phase position of both synchronous motors with respect to the cycle of the alternating voltage, whereas by means of transformer 24 the phase difference between the two motors may be varied. Instead of transformers other equivalent and conventional means, for instance, phase advancers, may be employed for shifting the position of phase, or instead thereof the casing of at least one motor may be of the rotatable type.

A current path which forms an impedance for alternating currents is arranged in parallel relation to each of the three pairs of contacts. The parallel current paths consist in the embodiment shown respectively of an ohmic resistance 46, 47, 48 and of a condenser 56, 57, 58. The parallel-connected current paths cause a lowering of the voltage between the contacts broken as is hereinafter described.

The magnet bodies 36, 37, 38 of the three reactors are so proportioned that they are already saturated at low values of the current lying in the neighborhood of the point at which the current passes the zero value. This may be, for instance, attained by choosing a suitable high-grade magnetic metal. The effect of the reactor saturated already at low current intensities consists in a flattening distortion of the curve of the alternating current, whereby the current values are reduced in the neighborhood of the zero value as hereinafter described. In the rectifier shown a second exciting winding 66, 67, 68 is respectively arranged on each magnet body 36, 37, 38. These three exciting windings are connected in series to the terminals 20 and 21 through a rheostat 19, the terminals being connected to a power source. The reactors are biased with the aid of the windings 66, 67, 68 so that the current values at which the magnet bodies are saturated may be adjusted.

The rectifier operates as follows:

The synchronous motors 14 and 15 are brought in phase with the alternating current in such a manner that each of the cam discs 65, 66' etc. opens its contacts at a moment when the current is maintained at a very low value owing to the effect of the desaturated reactor. The speed of the contact bridges 61, 71, 81 is so great that the increasing voltage recurring between the opening contacts remains smaller than the disruptive voltage between the contacts. The voltage between the contacts is maintained low for a certain time after the opening moment of the contacts owing to the effect of the parallel-connected current paths 46, 56; 47, 57 and 48, 58 so that no sparking occurs.

The time interval within which the contacts of the contact breaker are closed during each second half cycle may be varied by varying the position of phase of the second synchronous motor 14 with respect to that of the motor 15 and by the rotation of one cam disc of each circuit breaker with respect to the other cam disc. If the movable cam discs are so adjusted that the contacts are closed at the moment at which the current supply voltage of the next following phase is equal to that of the previously connected phase, the maximum current intensity flows in the rectifier circuit. If the closure of the contact takes place at a later moment, the current intensity of the direct current produced decreases. The same also applies to the voltage between the terminals 12 and 13. With the aid of the described apparatus it is, therefore, possible to regulate at will the current intensity and voltage of the rectified current.

In the converter above described the current and the voltage of the direct current produced may also be controlled by varying the magnetic bias of the reactors through varying the resistance 19 or by varying the magnitude of the resistance of the parallel current paths 46, 56, etc. Before proceeding with the description of these control means the behavior of the reactors and of the parallel-connected current paths will be first explained more in detail.

Figure 3:
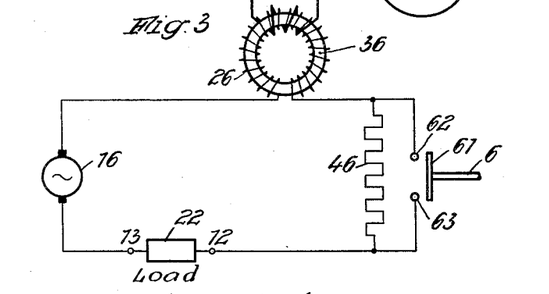
Fig. 3 shows a single-phase circuit breaker in diagrammatic form and serves to explain the operation.
Figure 4:
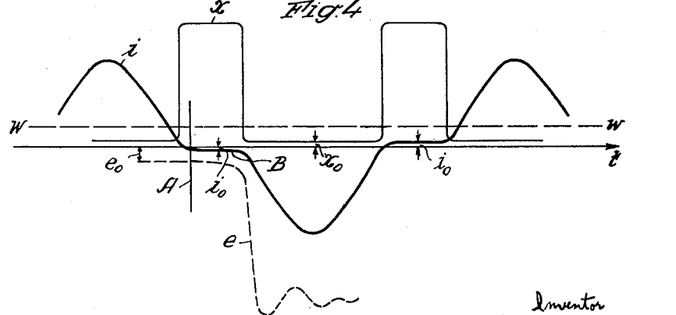
Fig. 4 is a graphic representation of the variations of the voltage and current flowing in the circuit shown in Fig. 3.

Fig. 3 shows a single-phase circuit breaker which may be considered as representing one of the three part-circuits of Fig. 1, as is apparent from the identical reference numerals. Fig. 4 is a graphic representation of the variations of the resistance of the reactor as well as of the intensity of current flowing in the circuit in Fig. 3 and of the voltage between the contacts.

In Fig. 3, 16 is the alternating-current source. 6, 61, 62 and 63 indicate parts of the circuit breaker. 36 is the magnet body and 26 the winding of the saturable reactor. 46 is a parallel-connected resistor. The winding 22 inserted between the terminals 12 and 13 represents the self-inductance of the commutation circuit. The resistance $w$ of the parallel-connected resistor 46 is smaller than the resistance $x$ of the reactor if the reactor is not saturated.

In Fig. 4, the curve $i$ represents the current which would flow in the circuit shown in Fig. 3 if the contact 61 were always closed. The curve $i$ is so distorted compared to the usual sine curve that the current intensity in the neighborhood of the zero value is reduced. There is, so to say, an interval during which the current remains below the low value $i_0$. This weak current interval is caused by the fact that the resistance $x$ of the reactor increases considerably at low current intensities in the neighborhood of the zero passage of the current. The periodical variations of the resistance of the reactor are represented by the curve $x$, and the resistance of the parallel-connected resistor 46 by the straight line $w$. $e$ denotes the curve of the recurring voltage between the contacts. At the moment A occurs the breaking of the contacts.

The voltage does not increase at once to the full value of the voltage of the circuit, but only to the value $e_0$, since the voltage divides itself between the parallel resistance $w$ and the inductive resistance $x$ connected in series therewith, and since the voltage across $w$ is small owing to the high value of $x$. Only at the moment B at which the saturation of the iron core 36 of the reactor 26 occurs and, therefore, its resistance suddenly drops to a small value $x_0$, the voltage $e$ increases to the full value of the voltage of the supply circuit. There is, therefore, a sufficient interval A to B available within which the voltage is very low and within which the breaking of the contacts may be easily effected.

Consequently, it is advisable to adjust the rectifier shown in Fig. 1 in such a manner that the contacts are broken in each phase during the interval of the weak current $i_0$ (Fig. 4) and the low voltage $e_0$ (Fig. 4). A rectifier thus adjusted is also suitable for rectifying and controlling high voltages, for instance, of the order of some hundreds of volts and high current intensities, for instance of hundreds and thousands of amperes without giving rise to any trouble due to sparking.

The adjustment is preferably so effected that one of the three control devices above described is adjusted to a value favorable for the system in question and only the other two are varied during the operation so as to control the current and voltage. Thus, for instance, the resistances 46 etc. and the condensers 56 etc. shown in Fig. 1 may be adjusted to a predetermined value. The control is then effected by changing the phase displacement of the synchronous motors by adjusting the transformer 25. At the same time also the magnetic bias of the reactors may be varied by an adjustment of the resistance 19. Both control devices 19 and 25 may, for instance, be coupled with each other and provided with a common hand wheel or the like. Such coupling is represented in Fig. 1 by the connecting member 25'. The transformer 24 may also in this case be adjusted to a fixed value.

However, the control may also be so effected that the resistance 19 remains adjusted to a fixed value and that the control is effected by adjusting one or both transformers 24 and 25. In this case the impedance of the parallel paths (for instance 46 or 56) is preferably varied at the same time. These and other combinations of the control methods always influence the current and the voltage of the rectified current.

Some modified forms of circuit breakers are hereinafter described which may be employed according to the invention in connection with the arrangement shown in Fig. 1.

Figure 5:
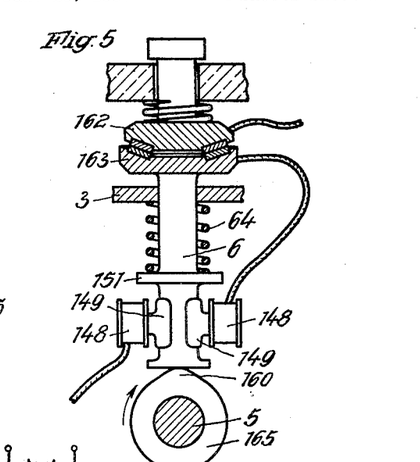
Fig. 5 is a modified form of the mechanical part of a rectifier which may be used in the embodiment shown in Fig. 1.

Fig. 5 shows one form of the circuit breakers for the rectifier in which only one cam disc is employed for operating each break contact and in which the time interval within which the contacts are closed may be adjusted by electromagnetic means. In Fig. 5, 162 is a stationary contact which is arranged on the traverse 2. 163 is a movable contact mounted on a tappet 6. The tappet 6 has a collar 151 and is under the action of the spring 64 which tends to open the contacts 162 and 163. Against the force of the spring acts a short cam 160 mounted on the shaft 5. The cam serves to initiate the closure of the contacts, thereby causing a current to flow through the coils 148 of an electromagnetic holding device whose cores firmly press the gripping jaws 149 against the tappet 6, thus preventing the contacts from opening when the cam 160 has rotated in the direction indicated by the arrow. Only when the current has dropped to such a value that it may be interrupted without sparking is the tappet 6 released and the contacts separated by the force of the spring 64. If the position of the cam 160 is varied relatively to the alternating voltage, for instance, by varying the position of phase of the synchronous motor driving the shaft 5, a value of the current or of the voltage is obtained which is the lower, the later the switching-in operation is brought about by the cam 160.

Figure 6:
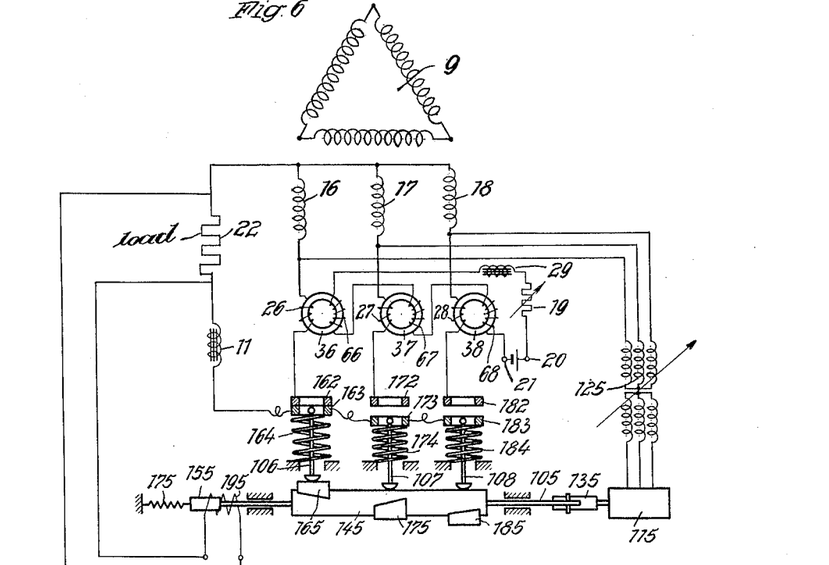
Fig. 6 shows the mechanical and the electrical portion of another embodiment.

A further embodiment of my invention is shown in Fig. 6. 9 denotes the primary winding and 16, 17, 18 the secondary windings. The secondary windings are connected with the reactors 26, 27, 28 respectively each having a core 36, 37, 38 respectively. The corresponding stationary contacts 162, 172, 182 are connected to the reactors. The appertaining movable contacts 163, 173, 183 are arranged on tappets 106, 107, 108. The springs 164, 174, 184 have the tendency to open the contacts. The circuit breaker is driven by a shaft 105 on which is mounted a cam cylinder 145. Each circuit breaker is provided with a cam 165, 175, 185 respectively, each being tapered in the axial direction of shaft 105. The cam shaft 105 is slidable in the axial direction together with the cylinder 145. Between the synchronous motor 115 and the shaft 105 is provided a coupling 135 which permits axial displacements of the shaft. The cam shaft 105 is automatically shifted, for instance, by means of the magnetic device 155, 195 and of a spring 175 whose force acts in a direction opposite to the magnetic device.

The motor 115 is connected to the secondary side of the main transformer through an induction regulator 125, by means of which the moments at which the contacts are made and broken may be shifted with respect to the cycle of the current to be interrupted.

If the cylinder 145 is displaced in the axial direction the duration of each switching-in period is varied owing to the wedge-shaped cam. The magnetic device 195 is controlled in accordance with the power output or load of the arrangement but may also be actuated in response to the output voltage or other magnitudes upon which the regulation is desired to be dependent.

With the aid of the induction regulator 125 and of the magnetic adjusting device 155, 195, it is, therefore, possible to adjust at will the moment at which the switching-in occurs and also independently thereof the moment at which the switching-out operation is to be effected.

The direct-current circuit may be traced from the movable contacts 163, 173, 183 through a reactance coil 11 and the load 22 to the neutral point of the transformer windings 16, 17, 18.

To improve the commutation, the iron cores 36, 37 and 38 are biased by the exciting coils 66, 67, 68.

As will be apparent from Fig. 6, the moment at which the separation of the contacts takes place may be controlled by a device operating automatically in accordance with the load. This is advantageous, since the phase position, relative to the voltage cycle, of the moment most favorable for starting the commutation varies in accordance with load variations.

If the rectifier is connected to a counter-voltage, for instance to a storage battery, the moment at which the disconnection occurs is preferably adjusted according to the value of the direct-current counter-voltage. Instead of the total value of the direct-current counter-voltage, also the difference between the direct voltage supplied by the rectifier and the counter-voltage may be used as a control magnitude. In this manner a greater sensitiveness of the control may be attained.

Since also the ripple of the direct current influences the commutation, the adjustment of the moment at which the disconnection takes place may also be varied in the case of an incomplete smoothening of the direct current in accordance with the degree of smoothening of the direct current. The sparking may best be suppressed if the moment at which the disconnection takes place is adjusted to a value in the neighborhood of the zero value of the current.

If the alternating current or voltage is not sinusoidol, the magnitude and the position of phase of the harmonic vibrations should also be taken into account, and under certain circumstances the control of the moment at which the disconnection occurs must also be made conditional upon other values, for instance upon the occurrence of asymmetries which may be present in the alternating-current portion of polyphase arrangements.

All the above-mentioned requirements regarding the automatic shifting of the moment at which the switching-in and switching-out take place may be fullfilled by the use of the converter shown in Fig. 6.

As already mentioned, the saturable reactors may also be employed to control the switching-in period during each second half cycle. By a suitable magnetic bias of the reactors 26, 36, 66 and 27, 37, 67 and 28, 38, 68, i. e., particularly by suitably energizing the windings 66, 67, 68 the moment at which the sudden change of the inductive resistance of the reactors occurs within the period of the flow of current may be shifted. In considering the curves shown in Fig. 4, it will be seen that by varying the premagnetization of the reactor the resistance curve x is shifted to the right or to the left with respect to the current curve i by a corresponding adjustment of the rheostat 19 (in Fig. 1 or Fig. 6). With the aid of magnetically regulatable reactors the voltage and intensity of the direct current produced by the rectifier may thus also be controlled.

The above-described control consisting in varying the magnetic bias of the reactors may be employed in combination with the mechanical adjusting device shown in Figs. 1, 2 and 5; however, it may also be employed without such a mechanical adjusting device. In the latter case the rectifiers are reduced to a simplified construction of the mechanical part. An embodiment of such a rectifier is shown in Fig. 7.

Figure 7:
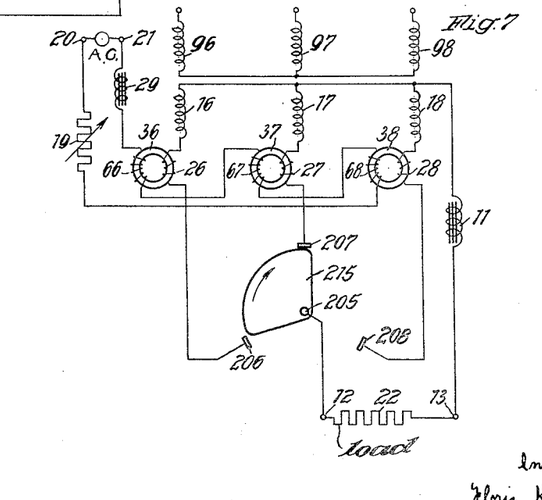
Fig. 7 shows another embodiment of the rectifier according to my invention. In this rectifier the intensity and voltage of the direct current is controlled by varying the magnetic bias of reactors.

The individual parts of the rectifier shown in Fig. 7 are designated by the same numerals as the corresponding parts in the preceding figures. 96, 97 and 98 are the primary windings of the main transformer. 16, 17 and 18 are the secondary windings. 36, 37, 38 denote the magnet bodies of the three reactors, 26, 27, 28 the main windings of the reactors and 66, 67, 68 the windings for the magnetic bias. With the aid of the resistance 19 the magnetic bias may be changed. A rotary contact circuit breaker is employed comprising a driving shaft 205, an arcuate contact member 215 and three stationary contacts 206, 207, 208. The shaft 205 is driven by a synchronous motor. 11 is a reactance coil in the direct-current circuit and 22 the load of the direct-current circuit connected to the output terminals 12 and 13. By adjusting the phase of the synchronous motor and the shaft 205 the moment at which the disconnection occurs may be regulated.

Since in the method above described the reactors are employed both for distorting the current curve and for regulating the mean value of the intensity and voltage of the rectified current, care should be taken that the magnetic bias of the reactors at the beginning of the period of the flow of the current is different from that at the end of this period. For this reason a voltage is employed which varies periodically and synchronously with the alternating current to be rectified. To this end, the terminals 20 and 21 in Figs. 1, 6 or 7 may be connected to an alternating-current source. They may be, for instance, connected to the circuit of the alternating current to be rectified. Furthermore, alternating current and superimposed direct current may be employed for the magnetic bias.

All methods above-described in which the intensity and the voltage of the rectified current is regulated by means of reactors may also be employed in connection with circuit breakers of any other type, for instance with rectifiers in which the current is transmitted from one electrode to the other by conducting liquid jets or by arcs. Also in such rectifiers the increase in current may be retarded with respect to the moment at which the conductive connection between the electrodes of the rectifier occurs by the above-described regulatable reactors and, therefore, the mean value of the current and voltage in the direct-current circuit may be varied.

According to the invention, the rectifier shown in Fig. 1 permits, furthermore, the following method of control:

In Fig. 1 are provided current paths in parallel relation to the break contacts, each path including a resistance 46, 47, 48 and a capacitor 56, 57, 58 respectively. The impedance of these parallel paths is so rated that it is smaller than the impedance of the reactors 26, 27, 28 when the reactors are not saturated. By means of a current traversing the reactors through the parallel current path a portion of the voltage recurring between the contacts is kept away from the open contacts by the reactor. The excess voltage recurring between the separating contacts will not cause sparking if the impedance of the parallel path is properly rated. According to the invention, the parallel current path includes, preferably, a capacitive component. In the parallel current path is inserted, for instance, a capacitor (56 in Fig. 1). The capacitor forms with the other inductances, particularly with that of its reactor (for instance 26), present in the circuit, an oscillatory circuit which upon each break of the contacts is set into a state of oscillation. The oscillating current flows in each case also through the appertaining reactor while the contacts are open and sets the reactor into a state of magnetization which varies from instant to instant. By a suitable adjustment of the reactive component and the active component of the parallel current path, the frequency and attenuation of the oscillations may be so adjusted at will that the reactor is in the desired state of magnetization at the end of the breaking period, i. e. at the moment when the contact breaker just closes its contacts. It is thereby made possible to bias the reactor in such a way that at the end of the breaking time the premagnetization is in a direction opposite to the flow of current to be expected so that the reactor is not completely saturated. When now the breaker closes its contacts, the resistance of the reactor is very great, so that at first the current remains weak throughout an extended interval. At this closure moment the greatest portion of the operating voltage may be applied to the reactor. Only if after the direction of magnetization has reversed and after the state of saturation has been attained in the new direction of magnetization the resistance of the reactor decreases suddenly so that the intensity of the current rises to its normal value. Consequently, the contacts are closed at a low voltage and practically at zero current intensity. No sparking and no chattering of the contacts occurs. Since the currents flowing in the breaking period are substantially wattless currents, the inverse current losses are comparatively small. It will be clear from the foregoing (see also the following explanation of Fig. 11) that the length of the weak current interval measured from the moment of the contact closure to the moment when the sudden increase of the current intensity occurs, is dependent upon the adjustment of the parallel current path and that, therefore, the output energy varies if the parallel impedance is varied.

Figure 8:
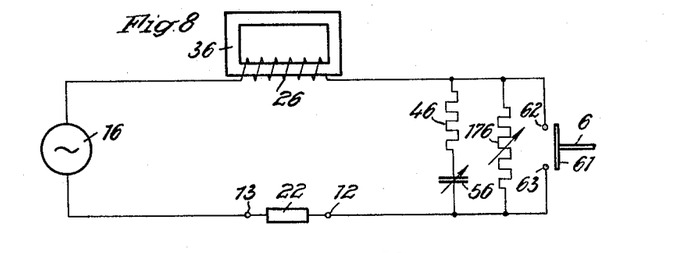
Figs. 8, 9 and 10 show three improved embodiments in a manner similar to the way of illustration used in Fig. 3.

The circuit shown in Fig. 8 contains a modified form of the regulatable current path. This current path consists of a capacitor 56 and a damping resistance 46 and is connected in parallel relation to the circuit breaker comprising the parts 6, 61, 62, 63. Furthermore, an ohmic resistance 176 is connected in parallel relation to the circuit breaker. This resistance 176 may also be parallel connected to the capacitor 56 so that in this case the damping resistance 46 is connected in series to the capacitor 56 as well as to the resistance 176.

If the capacitor 56 is rated for a comparatively very great capacity, the core 36 of the reactor 26 may be made of a less high-grade magnetic metal. The permeability of the metal need not be so high as is, for instance, advantageous for the embodiment shown in Fig. 1. The reactor is in this case not so expensive as when using a smaller capacitor. The condenser 56 may at all events be made at relatively low costs, since the voltage applied thereto is very low. A capacitor of larger dimensions does not involve any appreciable additional cost. Since the condenser 56 and the resistances 46 and 176 are controllable, the moment at which the current-weak pause occurs may be varied relatively to the closure of the contacts and, consequently, the current and the voltage may be regulated in the current consuming device 22 owing to the variation of the oscillatory circuit and, therefore, of the state of magnetization of the reactor 26, 36 upon closure of the contacts. The condenser 56 may consist of a plurality of condenser units which effect a coarse adjustment of the direct-current intensity and voltage. The ohmic resistance 176 may, however, be designed as a sliding contact resistance provided with many steps for a fine adjustment.

It is to be understood that the circuit shown in Fig. 8 may form a part-circuit of an arrangement otherwise constructed similar to Fig. 1, as is apparent from the reference numerals identical with those applied to the corresponding elements in Fig. 1.

When closing the contacts the condenser 56 is discharged through the resistance 46. In this case, particularly if the direct-current voltage is regulated to small values, relatively great current intensities occur which may lead to the formation of arcs and, therefore, to the consumption of the contacts 61, 62, 63 unless the resistance 46 is amply dimensioned for attenuating the surges of current, which might be disadvantageous in that now sparking may occur upon the opening of the contacts. This difficulty, however, may be avoided by providing interrupting devices in the parallel current path which operates synchronously with the circuit breakers of the rectifier. Such arrangements are shown in Figs. 9 and 10.

Figure 9:
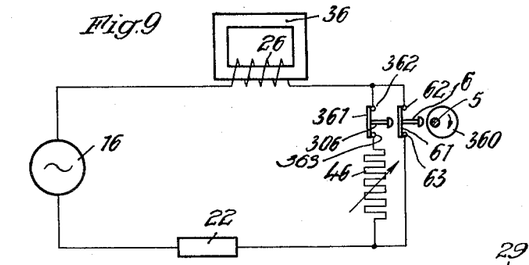

In Fig. 9 is connected a resistor 46 in parallel relation to the circuit breaking device 61, 62, 63 of the rectifier, the resistance varying periodically. The variation is effected by means of an auxiliary circuit breaker. This circuit breaker consists of two stationary contacts 362 and 363 and of a movable contact bridge 361 which is actuated by means of a tappet 306. The circuit breaking device 306, 361 is mechanically coupled with the circuit breaker 6, 61 in such a manner that the parallel current branch is closed through the resistance 46 shortly before the main contact closes. The coupling is so designed that the circuit breaker 306, 361 is again opened after the main contact has again opened. To this end the tappet 306 is somewhat shorter than the stroke of the tappet 6 and, therefore, the breaking period of the auxiliary circuit breaker is also shorter than that of the main contact. By varying the distance between the tappet 306 and the contact bridge 61 the ratio of the opening period to the closing period of the parallel-connected circuit breaking device may be regulated with respect to the periods of the main circuit breaker. The necessary regulations may be automatically controlled in accordance with the magnitude and nature of the load, the shape of the alternating current curve, the degree of saturation of the direct current produced, a counter-voltage on the direct-current side, if any, or in the case of polyphase alternating-current system also in accordance with asymmetries occurring in the system.

Figure 10:
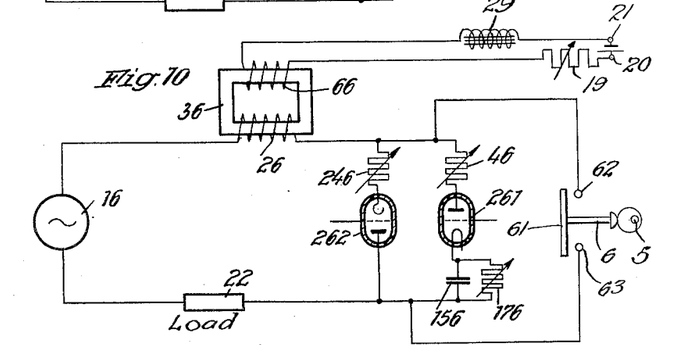

Fig. 10 is a modified form of the arrangement shown in Fig. 9, it being again assumed that the circuit forms part of an arrangement otherwise constructed as that of Fig. 1, as is indicated by the reference numerals of Fig. 10 which are identical with those used in Fig. 1. As compared to the circuit of Fig. 9, the auxiliary switch 361, 362, 363 in the parallel path of the variable resistance 46 is replaced by a grid-controlled tube 261 which automatically closes the parallel current path in due time, i. e., at the moment at which the voltage applied to the main circuit breaker 61, 62, 63 exceeds the value of the inverse voltage of the tube 261 adjusted by the grid biasing potential. However, in order that the current may not flow through the parallel path during the entire breaking period of the main switch 61 a condenser 156 of relatively great capacity is inserted in said path, a relatively high resistance 176 being parallel connected to the condenser. The latter is charged when the current flows through the tube 261. As soon as the voltage across the parallel path has increased to its maximum value and begins to decrease, the current flowing through the condenser 156 charged to the maximum value of the voltage is interrupted. During the next following operating pause of the tube 261, the condenser 156 is discharged through the parallel-connected resistance 176. The decrease of the voltage applied to the condenser 156 must be so rapidly effected through the resistance 176 that the condenser is sufficiently discharged when the main switch 61 opens again, so that if a residual charge of the condenser is still available, the latter does not increase the voltage between the contacts of the switch 61 required for igniting the tube 261.

Instead of the condenser 156 with a parallel-connected resistance 176 a device may be employed in a manner well known in the art with the aid of which the voltage applied to the grid of the tube is intermittently increased for interrupting the flow of current through the tube 261.

By means of the above-described parallel current path it is possible to prevent backfires through the resistance 46 after the opening of the main circuit breaker 61, or at least the development thereof is counteracted as far as possible. Under certain circumstances it must be, furthermore, prevented that premature discharges occur upon closing the circuit breaker 61. This may happen if either the operating voltage is too high or if, for instance, for the purpose of regulating the current and voltage, the closure does not occur at zero voltage but is more or less retarded with respect thereto. Care must be taken that shortly before the closure of the circuit breaker 61 a current traverses the self-saturating reactor 26 through a parallel path to the breaking gap. This is possible when employing the arrangement shown in Fig. 9, since the auxiliary contact 361 is mechanically controlled in accordance with the main contact 61. In contradistinction thereto the control of the tube 261 in Fig. 10 does not directly cooperate with the contacts of the circuit breaker 61. For this reason, a second parallel path through a second resistance 246 and another tube 262 are provided in Fig. 10. Shortly before the closure of the circuit breaker 61 a current flows through this second parallel path in a direction opposite to the flow of the current in the resistance 46 and the tube 261. This current causes a great voltage drop across the reactor 26 so that the voltage of the power source 16 at the moment at which the circuit breaker 61 is being closed is applied to the reactor 26 and only a very small portion thereof prevails between the contacts of the circuit breaker 61. The circuit breaker may then be switched in without causing any sparking.

The voltage and current control described in the foregoing with reference to Figs. 8, 9 and 10, is so effected that the time interval between the switching in of the parallel current path and the closure of the main circuit breaker 61 is varied. According to the current-time diagram shown in Fig. 11 which illustrates a small fraction of the half cycle it is assumed that the contact of the circuit breaker 61 is closed at the time $t_0$. If the parallel path is switched in shortly before, for instance, at the time $t_1$ a certain time elapses till the reactor 26 is saturated and the increase in current begins at the time $t_2$.

Figure 11:
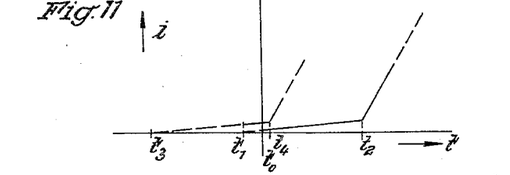
Fig. 11 is a graphic representation of the relation between current and time for a small fraction of a half cycle.

When switching in the parallel path at an earlier moment, for instance, at the time $t_3$ the greater portion of the time until the saturation occurs has already elapsed when the circuit breaker 61 is closed at the time $t_0$. The increase in current begins, therefore, immediately after the switching-in at the time $t_4$. The operation is, therefore, the same as is obtained by a variable magnetic bias of the reactor in the embodiment shown in Fig. 7. According to Fig. 10 the reactor 26 is biased by a sort of a series excitation by means of a current traversing the windings 26 of the reactor through the parallel path. By the use of auxiliary rectifiers with grid control according to Fig. 10 the control is preferably effected by varying the grid potential applied to the tube 262.

From the above considerations, it will be seen that also reactors may be used in the arrangement according to Figs. 9 and 10, which are not provided with an additional exciting winding for the production of a magnetic bias. It is, however, advantageous to employ such additional exciting windings in order to increase the available range of control and to improve the commutation. For this reason a reactor with an additional exciting winding 66 is shown in Fig. 10.

While the invention is described in connection with rectifiers, it may be used in circuit breaking devices of any type, for instance in inverters or in apparatus for converting alternating current of one frequency to alternating current of another frequency or also in circuit breaking devices for welding machines in which regulatable current impulses are produced.

I claim as my invention:

1. A polyphase arrangement for periodically interrupting alternating current comprising an alternating-current source, a circuit breaker connected to each phase of said source, controllable means in each phase for periodically decreasing the current intensity in the neighborhood of the zero value of the current by distorting the current curve, a synchronous motor, a current path including a voltage biasing impedance connected in each phase in parallel to said circuit breaker, a mechanical connection between said synchronous motor and said circuit breakers adapted to open the contacts of the circuit breaker in rhythm of the alternating current during the time interval of the current intensity reduced by said means, and means for varying the duration of the closure of the contacts of said circuit breakers so as to thereby vary the output voltage of the arrangement.

2. An arrangement for interrupting polyphase alternating current comprising an alternating-current source, a circuit breaker for each phase of the current to be interrupted, one contact of each circuit breaker being connected to one phase of the alternating-current source, the other contacts of the circuit breakers being electrically connected with one another, a motor for periodically operating said circuit breakers in rhythm of the alternating current to be interrupted, an impedance arranged in series with each circuit breaker, said impedance having a magnet body designed to be saturated beyond a given current intensity below the effective current intensity and to be unsaturated below said given intensity, a current path including another impedance and arranged in parallel relation to each circuit breaker, means for controlling the switching-in moment and means for controlling the switching-out moment of said breakers with respect to the period of the alternating voltage.

3. An arrangement for interrupting alternating current comprising a circuit breaker for each phase of the current to be interrupted, a reactor in series with said circuit breaker, said reactor being unsaturated at a lower value of the current intensity than the mean intensity of the alternating current to be interrupted, a current path parallel to the contacts of said circuit breaker, said path including an impedance for biasing the operating voltage recurring between the separating contacts of said breaker, and means for varying the resistance of said parallel current path in rhythm of the period of the alternating current.

4. An arrangement for periodically interrupting polyphase alternating current comprising an alternating-current source, a circuit breaker for each phase of the current to be interrupted having a contact connected to one of the phases of said alternating-current source, the other contacts of said circuit breakers being electrically connected with one another, a motor for periodically operating said circuit breakers in rhythm of the alternating current to be interrupted, a reactor arranged in series with each circuit breaker, said reactor having a magnet body designed to be unsaturated at low periodical current intensities and to be saturated upon exceeding a given periodical current intensity which is below the effective current intensity, a current path arranged in parallel relation to each circuit breaker and including an impedance for biasing the operating voltage recurring between the opening contacts of said breaker, and adjustable regulating means for shifting in operation the moment at which the contacts of said circuit breakers close with respect to the period of the voltage of the alternating current to be interrupted so as to thereby regulate at will the voltage of the current transferred through the circuit breakers.

5. An arrangement for periodically interrupting polyphase alternating current comprising an alternating-current source, a circuit breaker for each phase of the current to be interrupted having a contact connected to one of the phases of said alternating-current source, the other contacts of said circuit breakers being electrically connected with one another, a motor for periodically operating said circuit breakers in rhythm of the alternating current to be interrupted, a reactor arranged in series with each circuit breaker, said reactor having a magnet body designed to be unsaturated at low periodical current intensities and to be saturated upon exceeding a given periodical current intensity which is below the effective current intensity, a current path arranged in parallel relation to each circuit breaker, said path including an impedance for biasing the operating voltage recurring between the opening contacts of said breaker, and adjustable means for varying said impedance in order to regulate the energy flowing through the arrangement.

6. An arrangement for periodically interrupting polyphase alternating current comprising an alternating-current source, a circuit breaker for each phase of the current to be interrupted having a contact connected to one of the phases of said alternating-current source, the other contacts of said circuit breakers being electrically connected with one another, a motor for periodically operating said circuit breakers in rhythm of the alternating current to be interrupted, a reactor arranged in series with each circuit breaker, said reactor having a magnetic body designed to be unsaturated at low current intensities and to be saturated upon exceeding a given periodical current intensity, variable means for biasing the magnetization of said magnetic body, regulating means for adjusting at will said biasing means so as to control the energy transmitted through said circuit breakers, and a current path arranged in parallel relation to each circuit breaker and including an impedance for biasing the operating voltage recurring between the opening contacts of said breaker.

7. An arrangement for rectifying polyphase alternating current comprising an alternating-current source, a device in each phase of the alternating-current circuit adapted to permit the flow only every second half cycle of the alternating current in a given direction, a reactor arranged in each phase of the alternating-current circuit between said source and said device, said reactor having a magnetic body designed to be unsaturated at low current intensities and to be saturated upon exceeding a given periodical current intensity, an exciting coil on said magnetic body for biasing the saturation of said body, and a biasing circuit connected with said exciting coil, said biasing circuit including a rheostat for varying at will the excitation of said exciting coil and for shifting the phase position of the desaturation of the impedances depending upon the magnetic bias of said impedances with respect to the voltage cycle of the alternating current so as to thereby regulate the direct current voltage of the rectifying arrangement.

8. In an arrangement for transferring energy between an alternating current circuit and a second circuit of different current characteristics connected with said first circuit, in combination, an interrupter interposed in each connection between said two circuits, a current path including a voltage biasing impedance connected in parallel to said interrupter, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, means for controlling the phase position of the switching-in moments of said interrupters with respect to the voltage cycle of said alternating current, and means for controlling the phase position of the switching-out moments of said interrupters with respect to said cycle, said latter means being integrated with said switching-in control means so as to render the two controls interdependent.

9. In an arrangement for transferring energy between an alternating current circuit and a second circuit of different current characteristics connected with said first circuit, in combination, an interrupter interposed in each connection between said two circuits, a current path including a voltage biasing impedance connected in parallel to said interrupter, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, means for shifting the phase position of the switching-out moments of said interrupters with respect to the voltage cycle of said alternating current and for shifting the phase position of the switching-out moments of said interrupters with respect to said cycle, said means being designed to shift the phase position of said switching-out moments in opposite direction to and by a smaller amount than the phase position of said switching-in moments.

10. In an arrangement for transferring energy between an alternating current circuit and a direct current circuit, in combination, an interrupter interposed in each connection between said two circuits, a current path including a voltage biasing impedance connected in parallel to said interrupter, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, means for controlling the phase position of the switching-in moments of said interrupters with respect to the voltage cycle of said alternating current, and load responsive means for controlling the phase position of the switching-out moments of said interrupters with respect to said cycle so as to shift said latter phase position in dependence upon the output load of the arrangement.

11. An arrangement for rectifying polyphase alternating current comprising an alternating-current source, a device in each phase of the alternating-current circuit adapted to permit the flow only every second half cycle of the alternating current in a given direction, a reactor arranged in each phase of the alternating-current circuit between said source and said device, said reactor having a magnetic body designed to be unsaturated at low current intensities and to be saturated upon exceeding a given periodical current intensity, an exciting coil on said magnetic body for biasing the saturation of said body, a biasing circuit connected with said exciting coil, said biasing circuit including a rheostat for varying the excitation of said exciting coil and for shifting the phase position of the desaturation of the impedances depending upon the magnetic bias of said impedances with respect to the voltage cycle of the alternating current so as to thereby vary the output voltage of the rectifying arrangement, and means for shifting the phase position of said devices in dependence upon the bias of said magnetic body effected by said exciting winding.

12. In an arrangement for transferring energy between an alternating current circuit and a second circuit of different current characteristics connected with said first circuit, in combination, a commutating contact device designed to periodically open and close each connecting phase between said two circuits in synchronism with the voltage in said phase, said device having a pressure contact assembly for each connecting phase between said two circuits and an axially displaceable cam for actuating each contact assembly, said cams being shaped to control by their axial displacement the closing periods of said contact assemblies, a current biasing impedance arranged in series connection with each of said contact assemblies and designed to periodically increase its impedance value at current intensities near the zero value of the current to be interrupted, and means for displacing said cams during the operation of said contact device.

13. In an arrangement for transferring energy between an alternating current circuit and a second circuit of different current characteristics connected with said first circuit, in combination, a commutating contact device designed to periodically open and close each connecting phase between said two circuits in synchronism with the voltage in said phase, said device having a pressure contact assembly for each connecting phase between said two circuits and an axially displaceable cam for actuating each contact assembly, said cams being shaped to control by their axial displacement the closing periods of said contact assemblies, a reactor arranged in series with each of said contact assemblies, said reactor having a magnet body designed to become unsaturated at low current intensities so as to reduce said intensities in the neighborhood of the zero value of the current to be interrupted, a parallel path connected to each of said contact assemblies and containing an impedance for biasing the operating voltage recurring between the opening contacts of said contact device, and regulating means for simultaneously displacing said cams, said regulating means being connected with one of said circuits so as to displace said cams in dependency upon an electric magnitude of said circuits.

14. In an arrangement for transferring energy between an alternating current circuit and a second circuit of different current characteristics connected with said first circuit, in combination, an interrupter interposed in each connection between said two circuits, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, a current path connected in parallel to said interrupter and including an impedance for biasing the operating voltage recurring between the opening contacts of said interrupter, a device for varying the resistance of said parallel path in synchronism with said alternating current to be interrupted, and means for varying the conductive periods of said interrupters with respect to the voltage cycle of said alternating current so as to thereby control the energy transferred through the arrangement.

15. In an arrangement for transferring energy between an alternating current circuit and a second circuit of different current characteristics connected with said first circuit, in combination, an interrupter interposed in each connection between said two circuits, a reactor arranged in series with each of said interrupters and having a magnet body designed to become unsaturated at low current intensities so as to reduce said intensities in the neighborhood of the zero value of the current to be interrupted, a current path connected in parallel to said interrupter and including an impedance for biasing the operating voltage recurring between the opening contacts of said interrupter, means for varying the resistance of said parallel path in synchronism with said alternating current to be interrupted, and means for varying the conductive periods of said interrupters with respect to the voltage cycle of said alternating current so as to thereby control the energy transferred through the arrangement.

16. In an arrangement for transferring energy between an alternating current circuit and a second circuit of different current characteristics connected with said first circuit, in combination, an interrupter interposed in each connection between said two circuits, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, a current path connected in parallel to said interrupter and including an impedance for biasing the operating voltage recurring between the opening contacts of said interrupter, a device for varying the resistance of said parallel path in synchronism with said alternating current to be interrupted, said device comprising means for regulating the amount of the periodical variations of said resistance, and means for controlling the closing periods of said interrupters with respect to the voltage cycle of said alternating current so as to thereby control the energy transferred through the arrangement.

17. In an arrangement for transferring energy between an alternating current circuit and a second circuit of different current characteristics connected with said first circuit, in combination, an interrupter interposed in each connection between said two circuits, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, a current path including a voltage biasing impedance connected in parallel to said interrupter, a device for varying the resistance of said parallel path in synchronism with said alternating current to be interrupted, means for regulating the periodical variations of said parallel path lying within a half cycle, and means for controlling the closing periods of said interrupters with respect to the voltage cycle of said alternating current so as to thereby control the energy transferred through the arrangement.

18. In an arrangement for transferring energy between an alternating current circuit and a second circuit of different current characteristics connected with said first circuit, in combination, an interrupter interposed in each connection between said two circuits, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, a current path connected in parallel to said interrupter and including an impedance for biasing the operating voltage recurring between the opening contacts of said interrupter, means connected in said current path for periodically closing said path shortly before the corresponding interrupter closes and for opening said path after said interrupter opens, and means for controlling the closing periods of said interrupters with respect to the voltage cycle of said alternating current so as to thereby control the energy transferred through the arrangement.

19. In an arrangement for transferring energy between an alternating current circuit and a second circuit of different current characteristics connected with said first circuit, in combination, an interrupter interposed in each connection between said two circuits, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, means for controlling the closing periods of said interrupters with respect to the voltage cycle of said alternating current so as to thereby control the energy transferred through the arrangement, a current path connected in parallel to said interrupter and including an impedance for biasing the operating voltage recurring between the opening contacts of said interrupter, and a grid-controlled auxiliary tube for periodically opening and closing said parallel current path in synchronism with said alternating current.

20. In an arrangement for transferring energy between an alternating current circuit and a second circuit of different current characteristics connected with said first circuit, in combination, an interrupter interposed in each connection between said two circuits, drive means for successively operating said interrupters in synchronism with the alternating current to be interrupted, a current biasing impedance arranged in series connection with each of said interrupters, said series impedance being designed to increase its impedance value at current intensities in the neighborhood of the current zero value, means for controlling the closing periods of said interrupters with respect to the voltage cycle of said alternating current so as to thereby control the energy transferred through the arrangement, two current paths of different impedance connected in parallel relation to each of said interrupters, and switching means for closing one of said current paths only during the closure period of the corresponding interrupter and for closing the other current path during the opening period of said interrupter.

21. In an arrangement for transferring energy between an alternating current circuit and a second circuit of different current characteristics connected with said first circuit, in combination, a commutating contact device designed to periodically open and close each connecting phase between said two circuits in synchronism with the voltage in said phase, said device having a pressure contact assembly for each connecting phase between said two circuits and a cam shaft having cams for operating said contact assemblies, each cam consisting of two cam elements whose angular position with respect to each other is adjustable for timing the operation of said contacts, a current biasing impedance arranged in series connection with each of said contact assemblies and designed to periodically increase its impedance value at current intensities near the zero value of the current to be interrupted, and means for adjusting the angular position of the two elements of each of said cams.

22. In an arrangement for transferring energy between an alternating current circuit and a second circuit of different current characteristics connected with said first circuit, in combination, a commutating contact device designed to periodically open and close each connecting phase between said two circuits in synchronism with the voltage in said phase, said device having a pressure contact assembly for each connecting phase between said two circuits, a cam for each contact assembly consisting of two cam elements and a cam shaft carrying all of said cams, one of the elements of each cam being fixed on said shaft, the other being rotatable thereon, a second cam shaft geared to each of said rotatable cam elements, a synchronous motor for driving each shaft, the phase relations of both motors being variable with respect to one another for varying the relative angular position of the elements of each cam for timing the operation of said contacts, a current biasing impedance arranged in series connection with each of said contact assemblies and designed to periodically increase its impedance value at current intensities near the zero value of the current to be interrupted, and a current path including a voltage biasing impedance connected in parallel to each of said contact assemblies.

23. In combination, a commutating device for converting energy between an alternating current circuit and a circuit of different current characteristics, a saturable reactor series connected with said device in each phase of said alternating current circuit, said reactor being designed to periodically increase its resistance so as to thereby reduce the intensity of the current flowing through said device, premagnetizing means associated with said reactor for timely varying the periods of increased resistance with respect to the voltage cycle of the current to be converted, said means being designed to produce a premagnetization which alone is insufficient to saturate said reactor, and adjustable regulating means for varying said premagnetization during the operation of said commutating device so as to thereby vary the effective output energy of said device.

24. With a multiphase arrangement for transferring energy between an alternating current circuit and a direct current circuit, the combination of mechanical contact circuit breakers disposed between said alternating current circuit and said direct current circuit, each of said breakers being connected in a respective phase of said alternating current circuit, a device for periodically operating said breakers in synchronism with said alternating current circuit, said device being designed to actuate said breakers in succession with overlapping closing periods, so that short circuits including the simultaneously closed breakers are closed periodically, impedances designed to increase their apparent resistance abruptly at current values below a certain periodical low value so as to periodically flatten the curve of the current to be controlled by said breakers, said impedances being series connected with said breakers so as to form part of said periodically closed short circuits, and load responsive means for shifting the moments of the closings and of the openings of said breakers with respect to the cycle of the alternating voltage.

25. An arrangement for interrupting polyphase alternating current, comprising an alternating-current source, a circuit breaker for each phase of the current to be interrupted, one contact of each circuit breaker being connected to a phase of the alternating-current source, the other contacts of the circuit breakers being electrically connected with one another, a motor for periodically operating said circuit breakers in rhythm of the alternating current to be interrupted, a reactor arranged in series with each circuit breaker, said reactor having a magnet body designed to be unsaturated at low current intensities and saturated upon exceeding a given periodical current intensity, a current path arranged in parallel relation to each circuit breaker, said current path including an impedance for biasing the operating voltage recurring between said contacts, and means for shifting the time interval of the closing of the current of said circuit breakers with respect to the cycle of the alternating voltage, each of said reactors having a winding arranged on said magnetic body for producing an additional magnetic bias, said windings being arranged in a circuit including means for varying the excitation of said windings so as to thereby vary the output energy of the arrangement.

26. An arrangement for interrupting polyphase alternating current, comprising an alternating-current source, a circuit breaker for each phase of the current to be interrupted, one contact of each circuit breaker being connected to a phase of the alternating-current source, the other contacts of the circuit breakers being electrically connected with one another, a motor for periodically operating said circuit breakers in ryhthm of the alternating current to be interrupted, a saturable reactor arranged in series with each circuit breaker, said reactor having a magnet body designed to be saturated beyond a given current intensity below the effective current intensity and to be unsaturated below said given intensity, a current path arranged in parallel relation to each circuit breaker, said current path including a regulatable impedance for biasing the operating voltage recurring between the opening contacts of said breaker, means for shifting the time interval of the mechanical opening and closing of the contacts of said circuit breakers with respect to the phase of the alternating voltage so as to thereby vary the output energy of the arrangement, and regulatable circuit means for premagnetizating said reactors.

27. With a periodically-operating mechanical contact interrupter for transferring energy between an alternating current circuit and another circuit of different current characteristic, in combination, means connected in parallel to the contact break of said interrupter for reducing the rate of increase of the voltage recurring between the opening contacts of said interrupter, a magnetically saturable reactor connected in series with said interrupter and designed to periodically increase by desaturation its impedance value at small intensities of the current to be interrupted so as to flatten the curve portions of said current in the neighborhood of the zero passage, and regulatable means for varying the relation of the flattened portion of said current curve with respect to the periodic operation of said interrupter in order to thereby regulate at will the energy transferred through said interrupter.

28. An arrangement for interrupting the current in an alternating current circuit, comprising in combination a commutating circuit breaker having a contact interrupter disposed in each phase to be interrupted of said alternating current circuit, a motor connected to said alternating current circuit for operating said circuit breaker in synchronism with said alternating current, mechanical connecting means between said motor and said circuit breaker adapted to close the contacts of each of said interrupters in each second half cycle of said alternating current for a period at most equal to the duration of a half cycle, a periodically variable impedance connected in series with each of said interrupters and designed to flatten the curve of the current to be interrupted in the neighborhood of the zero passages of said curve, and adjustable means for varying said closing period of said interrupters relative to the flattened curve portions of said alternating current so as to thereby vary the output voltage of the arrangement.

29. In combination, an alternating current circuit comprising a plurality of phase conductors, a direct current circuit, switching means operated in electrical synchronism with the voltage of said alternating current circuit for effecting transfer of energy between said alternating current circuit and said direct current circuit during predetermined intervals, a saturable inductive device connected between said alternating current circuit and said switching means for controlling the magnitude and the rate of change of current transmitted by said switching means at the beginning and the end of each of said intervals, and electric valve means for establishing and interrupting the flow of current at the beginning and the end of said intervals.

30. In combination, an alternating current circuit, a direct current circuit, switching means arranged to transmit energy between said circuits during predetermined intervals, a saturable inductive device connected between said alternating current circuit and said switching means for controlling the magnitude and the rate of change of current at the beginning of said intervals, and electric valve means for establishing the flow of current through said inductive device at the beginning of said intervals.

31. In combination, an alternating current circuit, a direct current circuit, switching means operated to transmit energy between said circuits during predetermined intervals, a saturable inductive device connected between said alternating current circuit and said switching means for decreasing the magnitude and the rate of change of current at the end of said intervals, and electric valve means for interrupting the flow of current through said inductive device at the end of said intervals.

32. In combination, an alternating current circuit, a direct current circuit, a periodically operating contactor arranged to transmit energy between said circuits during predetermined intervals, a saturable reactor connected between said alternating current circuit and said contactor for periodically reducing the rate of change of the current transmitted through said contactor at low current intensities, and electric circuit means connected in parallel to said contactor and comprising interrupting means for establishing and interrupting the flow of current through said reactor, and means for controlling said interrupting means in synchronism with said contactor and in a given relation to said intervals to prevent sparking at said contactor.

FLORIS KOPPELMANN.